United States Patent
Tsumita

(10) Patent No.: US 11,654,753 B2
(45) Date of Patent: May 23, 2023

(54) VEHICLE

(71) Applicants: TOYOTA JIDOSHA KABUSHIKI KAISHA, Toyota Aichi-ken (JP); SUBARU CORPORATION, Tokyo (JP)

(72) Inventor: Sho Tsumita, Seto Aichi-ken (JP)

(73) Assignees: TOYOTA JIDOSHA KABUSHIKI KAISHA, Toyota Aichi-ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/591,931

(22) Filed: Feb. 3, 2022

(65) Prior Publication Data
US 2022/0289004 A1    Sep. 15, 2022

(30) Foreign Application Priority Data
Mar. 11, 2021    (JP) ............................. JP2021-039031

(51) Int. Cl.
*B60J 5/04* (2006.01)
*H01Q 1/32* (2006.01)

(52) U.S. Cl.
CPC .......... *B60J 5/0402* (2013.01); *B60J 5/0468* (2013.01); *H01Q 1/3283* (2013.01)

(58) Field of Classification Search
CPC ..... B60J 5/0402; B60J 5/0468; H01Q 1/3283; B60R 25/245
See application file for complete search history.

(56) References Cited

U.S. PATENT DOCUMENTS

| | | | |
|---|---|---|---|
| 10,351,099 B2* | 7/2019 | Liubakka | B60R 25/24 |
| 2012/0032463 A1* | 2/2012 | Gerndorf et al. | B60R 13/025 |
| | | | 296/1.08 |
| 2016/0087327 A1* | 3/2016 | Niihara | H01Q 1/1271 |
| | | | 343/713 |
| 2018/0304822 A1* | 10/2018 | Schulte | B60R 13/04 |
| 2021/0284099 A1* | 9/2021 | Uehata | H01Q 1/3283 |
| 2022/0006195 A1* | 1/2022 | Ikeda | H01Q 9/045 |

FOREIGN PATENT DOCUMENTS

| | | |
|---|---|---|
| JP | 2012-111413 A | 6/2012 |
| JP | 2015-071398 A | 4/2015 |
| JP | 2017-212479 A | 11/2017 |

* cited by examiner

*Primary Examiner* — Jason S Morrow
(74) *Attorney, Agent, or Firm* — Dinsmore & Shohl LLP

(57) ABSTRACT

The vehicle includes a side door with a window, an antenna, and a bracket. The side door includes an outer panel located downward from the window and a door frame extending along the perimeter of the window. The antenna is fixed by double-sided adhesive tape on an outer face of a section of the door frame that extends in the up-down direction. The bracket is attached to the side door, and faces a cable extending downward from the antenna. The bracket has a cable opening through which the cable passes, between the bracket and the door frame. The cable opening has a shape through which the antenna cannot pass.

8 Claims, 4 Drawing Sheets

VEHICLE

CROSS-REFERENCE TO RELATED APPLICATION

This application claims priority to Japanese Patent Application No. 2021-039031 filed on Mar. 11, 2021, incorporated herein by reference in its entirety.

BACKGROUND

1. Technical Field

The technology of the present disclosure relates to a vehicle, and particularly relates to a vehicle to which an antenna is attached.

2. Description of Related Art

Japanese Unexamined Patent Application Publication No. 2017-212479 (JP 2017-212479 A) discloses a vehicle. In this vehicle, an antenna for a smart key system (also referred to as keyless entry) is attached to a center pillar of a vehicle body.

SUMMARY

Depending on the design of the vehicle, the center pillar of the body may be covered by a door frame. In this case, radio waves to be transmitted and received by the antenna are obstructed by the door frame, which may reduce the sensitivity of the antenna. In order to circumvent this, it is conceivable to attach the antenna to the door frame instead of to the center pillar. In fact, when taking other factors into consideration, it is often advantageous to attach the antenna to the door frame rather than the center pillar.

However, the antenna attached to the door frame is likely to be subjected to shock and vibrations associated with the opening and closing of side doors, and a situation in which the antenna comes loose from the door frame by being repeatedly subjected to such shock and vibrations can be envisioned. At this time, when the antenna that has come loose from the door frame falls down to the back side of an outer panel of the side door, the sensitivity of the antenna may be markedly reduced due to the shielding effect of the outer panel.

In order to suppress the above-described antenna from coming loose, it is conceivable to firmly attach the antenna to the door frame by a fixing device such as an attaching part or a bolt. However, space in the door frame is limited, and it is difficult to secure space for disposing such fixing devices. Further, a structure in which the antenna is fixed by a fixing device will likely increase the number of processes and costs for manufacturing the vehicle.

The present disclosure provides a technology related to attaching an antenna to a door frame.

A first aspect of the present disclosure is a vehicle. The vehicle includes a side door with a window, an antenna, and a bracket. The side door includes an outer panel located downward from the window and a door frame extending along a perimeter of the window. The antenna is fixed by double-sided adhesive tape on an outer face of a section of the door frame that extends in the up-down direction. The bracket is attached to the side door, and faces a cable extending downward from the antenna. The bracket includes a cable opening through which the cable passes, between the bracket and the door frame. The cable opening has a shape through which the antenna in not able to pass.

In the vehicle according to the first aspect of the present disclosure, a dimension of the cable opening in the front-rear direction may be smaller than a dimension of the antenna in the front-rear direction.

In the vehicle according to the first aspect of the present disclosure, the bracket may include a counterface that faces the antenna from below, at a position adjacent to the cable opening.

In the vehicle according to the first aspect of the present disclosure, the side door may be a rear side door adjacent to the front side door for a driver's seat. The rear side door may be located rearward from the front side door. The section of the door frame that extends in the up-down direction may be a section located forward from the window.

In the vehicle according to the first aspect of the present disclosure, the side door may be a front side door for the driver's seat. The section of the door frame that extends in the up-down direction to which the antenna is fixed may be a section located rearward from the window.

In the vehicle according to the first aspect of the present disclosure, the antenna may be configured to communicate with a wireless communication terminal possessed by a user of the vehicle.

In the vehicle according to the first aspect of the present disclosure, the antenna may be an antenna for a smart key system.

In the vehicle according to the first aspect of the present disclosure, the side door may be a hinged door.

In the above configuration, the antenna is fixed to the door frame by double-sided adhesive tape. Using the double-sided adhesive tape enables the antenna to be firmly fixed to the door frame, even in the limited space of the door frame. On the other hand, the double-sided adhesive tape will inevitably deteriorate over time, and it is assumed that the antenna will come loose (or peel off) from the door frame in the process of using the vehicle over a long time. In this regard, the cable extends downward from the antenna, and the cable passes through a cable opening provided in the bracket. The cable opening has a shape through which the antenna is not able to pass. Accordingly, when the antenna comes loose from the door frame, the antenna descending along the door frame can be caught by the bracket. Thus, the antenna that has come loose from the door frame can be previously kept from falling down to the inner side of the outer panel, for example.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
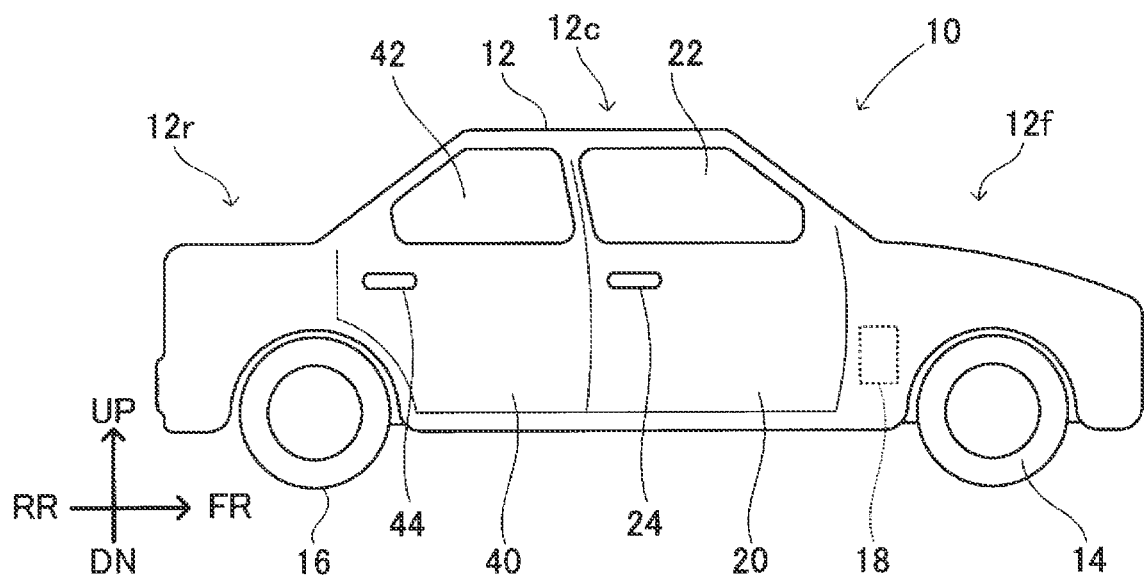
FIG. 1 schematically illustrates a vehicle 10 according to an embodiment.

According to an embodiment of the present technology, a dimension of the cable opening in the front-rear direction may be smaller than a dimension of the antenna in the front-rear direction. Note however, that such a shape of the cable opening is an example of a shape that the aforementioned antenna cannot pass through, and does not limit the shape of the cable opening. The dimension of the cable opening in the front-rear direction means the dimension of the cable opening in the front-rear direction of the vehicle when a bracket is attached to the side door and the side door is closed. The same applies to the dimension of the antenna in the front-rear direction.

According to an embodiment of the present technology, the bracket may include a counterface that faces the antenna from below, at a position adjacent to the cable opening. With such a configuration, the antenna that has come loose from a door frame and descends along the door frame is stably supported by the counterface of the bracket.

According to an embodiment of the present technology, the side door may be a rear side door that is adjacent to a front side door for a driver's seat. The rear side door may be located rearward from the front side door. In this case, the section of the door frame that extends in the up-down direction to which the antenna is fixed may be a section located forward from the window. With such a configuration, the antenna can be disposed adjacent to the front side door, and the communicable range of the antenna can be set in the vicinity of the front side door (particularly, in the vicinity of the door handle thereof).

According to an embodiment of the present technology, the side door may be a front side door for the driver's seat. In this case, the section of the door frame that extends in the up-down direction to which the antenna is fixed may be a section located rearward from the window. With such a configuration as well, the antenna can be disposed adjacent to the front side door, and the communicable range of the antenna can be set in the vicinity of the front side door (particularly, in the vicinity of the door handle thereof).

According to an embodiment of the present technology, the antenna may be configured to communicate with a wireless communication terminal possessed by a user of the vehicle. In this case, the wireless communication terminal may be, for example, a mobile phone, a smartphone, a tablet, an electronic communication key, or an IC card.

According to an embodiment of the present technology, the antenna may be an antenna for a smart key system. Note however, that the use of the antenna is not limited in particular, and the technology disclosed in the present specification can be broadly applied, regardless of the use of the antenna and the communication method.

According to an embodiment of the present technology, the side door may be a hinged door. However, as other embodiments, the side door may be various types of side doors, such as a sliding door, a gull-wing door, a scissor door, or a butterfly door, for example.

In the present specification, expressions simply such as forward, rearward, and front-rear directions mean the forward, rearward, and front-rear directions of the vehicle, respectively. In the same way, expressions simply such as rightward, leftward, and right-left directions mean the rightward, leftward, and right-left directions of the vehicle, respectively, and simply such as upward, downward, and up-down directions mean the upward, downward, and up-down directions of the vehicle. For example, when the vehicle is placed on a horizontal plane, the up-down direction of the vehicle coincides with the vertical direction. Also, the right-left direction of the vehicle is parallel to the horizontal plane and parallel to the axles of the vehicle, and the front-rear direction of the vehicle is parallel to the horizontal plane and perpendicular to the axles of the vehicle.

Embodiment

A vehicle 10 according to an embodiment will be described with reference to the drawings. The vehicle 10 is a vehicle that travels over a road surface, and includes a body 12 and a plurality of wheels 14 and 16. The body 12 is mainly made of metal, although not limited thereto in particular. The body 12 mainly has a front portion 12f, a cabin 12c, and a rear portion 12r. The cabin 12c is configured to enable one or more users to ride therein. The wheels 14 and 16 include a pair of front wheels 14 and a pair of rear wheels 16. Note that the number of wheels 14 and 16 is not limited to four.

The vehicle 10 may be an electrified vehicle, although not limited thereto in particular. The term electrified vehicle here broadly refers to an automobile in which at least one of the wheels 14 and 16 is driven by a traction motor. The vehicle 10 includes, for example, battery electric vehicles charged by an external power source, hybrid electric vehicles having a traction motor and an engine, fuel cell electric vehicles that use fuel cells as a power source, and so forth. Also, the vehicle 10 according to the present embodiment is not limited to vehicles driven by a user, and also includes vehicles operated by external devices and autonomously-driven vehicles.

Here, the direction FR in the drawings indicates forward in the front-rear direction of the vehicle 10. The direction RR indicates rearward in the front-rear direction of the vehicle 10. Also, the direction LH indicates leftward in the right-left direction (or width direction) of the vehicle 10. The direction RH indicates rightward in the right-left direction of the vehicle 10. The direction UP indicates upward in the up-down direction of the vehicle 10. The direction DN indicates downward in the up-down direction of the vehicle 10. In the present embodiment, the forward, rearward, and front-rear directions of the vehicle 10, the rightward, leftward, and right-left directions of the vehicle 10, and the upward, downward, and up-down directions of the vehicle 10, may be simply referred to as the forward, rearward, and front-rear directions, the rightward, leftward, and right-left directions, and the upward, downward, and up-down directions, respectively.

The vehicle 10 further includes a plurality of side doors 20 and 40. The side doors 20 and 40 are located on side faces of the body 12, and are configured to be openable and closable. Users can enter and exit the cabin 12c by opening one of the side doors 20 and 40. The side doors 20 and 40 include a front side door 20 and a rear side door 40, although not limited thereto in particular. The front side door 20 is a door for the driver's seat of the vehicle 10. The rear side door 40 is a door for other occupant seats and is adjacent to the front side door 20 rearward therefrom. The side doors 20 and 40 in the present embodiment are hinged doors that pivot horizontally as to the body 12, although not limited thereto in particular.

The side doors 20 and 40 are provided with windows 22 and 42 and door handles 24 and 44, respectively. Users can open the side doors 20 and 40 by operating the door handles 24 and 44. Note however, that the side doors 20 and 40 are locked and unlocked by a smart key system 18 that the vehicle 10 is provided with. When the side doors 20 and 40 are locked, the operations of the door handles 24 and 44 are disabled, and the side doors 20 and 40 are fixed so as to be unopenable. The smart key system 18 locks and unlocks the side doors 20 and 40 by wirelessly communicating with a wireless communication terminal (omitted from illustration) that is possessed by the user.

Figure 2:
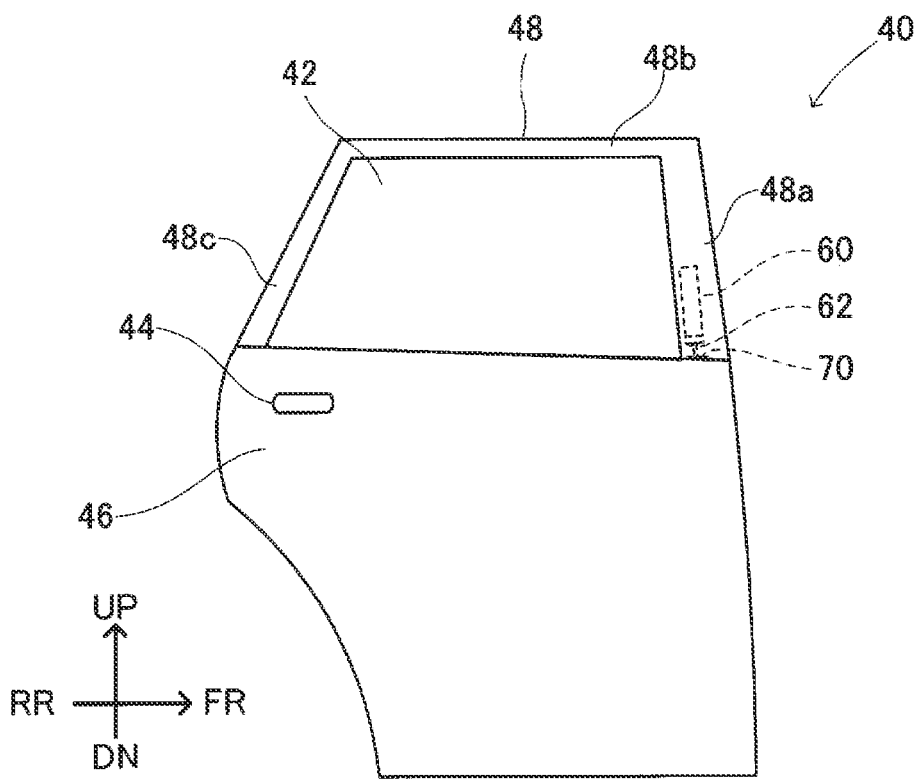
FIG. 2 illustrates a rear side door 40 of the vehicle 10.

As illustrated in FIG. 2, the rear side door 40 has an outer panel 46 and a door frame 48. The outer panel 46 is located below the window 42 and is made of metal, although not limited to this in particular. The door handle 44 described above is located on the outer panel 46. The door frame 48 extends along the periphery of the window 42 and is made of metal, although not limited to this in particular. The door frame 48 generally has a first section 48a, a second section 48b, and a third section 48c. The first section 48a is located forward of the window 42 and extends upward from the outer panel 46. The second section 48b is located upward from the window 42 and extends rearward from the upper end of the first section 48a. The third section 48c is located rearward from the window 42 and extends downward from the rear end of the second section 48b to the outer panel 46. In other words, the third section 48c extends upward from the outer panel 46 to the rear end of the second section 48b. An antenna 60, which is described below, is attached to the first section 48a of the door frame 48.

The vehicle 10 further includes the antenna 60 and a bracket 70. The antenna 60 according to the present embodiment is an antenna for the smart key system 18, as an example. The antenna 60 is connected to the smart key system 18 via a cable 62. The antenna 60 is attached to the rear side door 40. The antenna 60 is located in the first section 48a of the door frame 48, and is disposed so as to be in the proximity of the door handle 24 of the front side door 20. Accordingly, the communicable range of the antenna 60 can be set to be in the vicinity of the handle 24 of the front side door 20.

Figure 3:
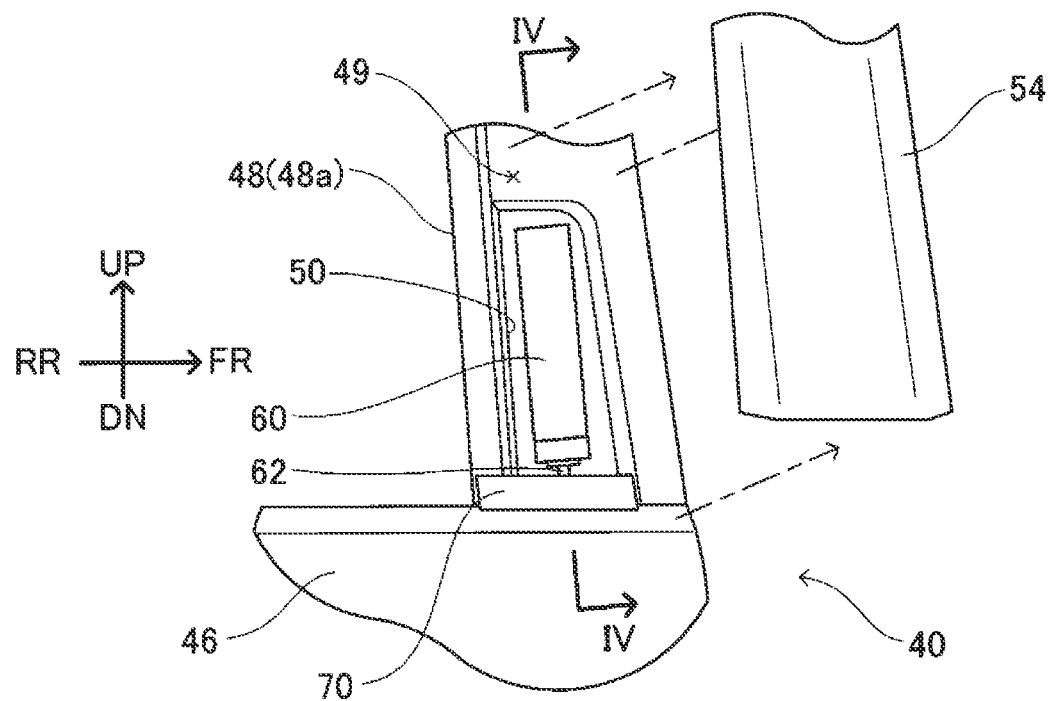
FIG. 3 illustrates an antenna 60 attached to the rear side door 40.

A structure for attaching the antenna 60 will be described in detail with reference to FIGS. 3 through 5. The antenna 60 is fixed to an outer face 49 of the first section 48a of the door frame 48 by double-sided adhesive tape 52. The specific material and structure of the double-sided adhesive tape 52 are not limited in particular. In some embodiments, the double-sided adhesive tape 52 is a tape for industrial usage, having a relatively strong adhesive force. The outer face 49 of the first section 48a is provided with a recessed portion 50 for accommodating the antenna 60, as an example. The cable 62 extends downward from the antenna 60 and is routed along the inner side of the outer panel 46.

A decorative panel 54 is attached to the first section 48a of the door frame 48. The decorative panel 54 is made of a polymer material such as resin, for example, and faces the outer face 49 of the first section 48a with the antenna 60 interposed therebetween. A sealing material 56 is provided on an inner face 54a of the decorative panel 54. The sealing material 56 is made of a flexible material such as foamed resin, for example, and presses the antenna 60 toward the door frame 48 by abutting on the antenna 60. The materials making up the decorative panel 54 and the sealing material 56 are not limited in particular here. Note however, that, in some embodiments, the materials making up the decorative panel 54 and the sealing material 56 are materials that transmit radio waves. Also, the sealing material 56 may have a flexible material or structure having a lower elastic modulus than the decorative panel 54.

The bracket 70 is attached to the rear side door 40. The bracket 70 is made of a polymer material such as resin, for example. The bracket 70 is located at a boundary between the outer panel 46 and the first section 48a of the door frame 48, and faces the cable 62. Note that the position of the bracket 70 is not limited to being at this boundary. The bracket 70 defines a cable opening 72 through which the cable 62 passes, between the bracket 70 and the door frame 48. A dimension W72 of the cable opening 72 in the front-rear direction is larger than a diameter D62 of the cable 62, but smaller than a dimension W60 of the antenna 60 in the front-rear direction. In other words, the cable opening 72 has a shape through which the antenna 60 cannot pass.

As described above, in the vehicle 10 according to the present embodiment, the antenna 60 is fixed to the door frame 48 by the double-sided adhesive tape 52. Using the double-sided adhesive tape 52 enables the antenna 60 to be firmly fixed to the door frame 48, even in the limited space of the door frame 48. On the other hand, the double-sided adhesive tape 52 will inevitably deteriorate over time, and it is assumed that the antenna 60 will come loose (or peel off) from the door frame 48 in the process of using the vehicle 10 over a long time.

Regarding the above point, the vehicle 10 according to the present embodiment is provided with the bracket 70. The bracket 70 faces the cable 62 that extends downward from the antenna 60, and defines the cable opening 72 through which the cable 62 passes between the bracket 70 and the door frame 48. Accordingly, the cable opening 72 has a shape through which the antenna 60 cannot pass. Thus, when the antenna 60 comes loose from the door frame 48, for example, the antenna 60 descending along the door frame 48 can be caught by the bracket 70. Therefore, the antenna 60 that has come loose from the door frame 48 can be previously kept from falling down to the inner side of the outer panel 46, for example.

Figure 4:
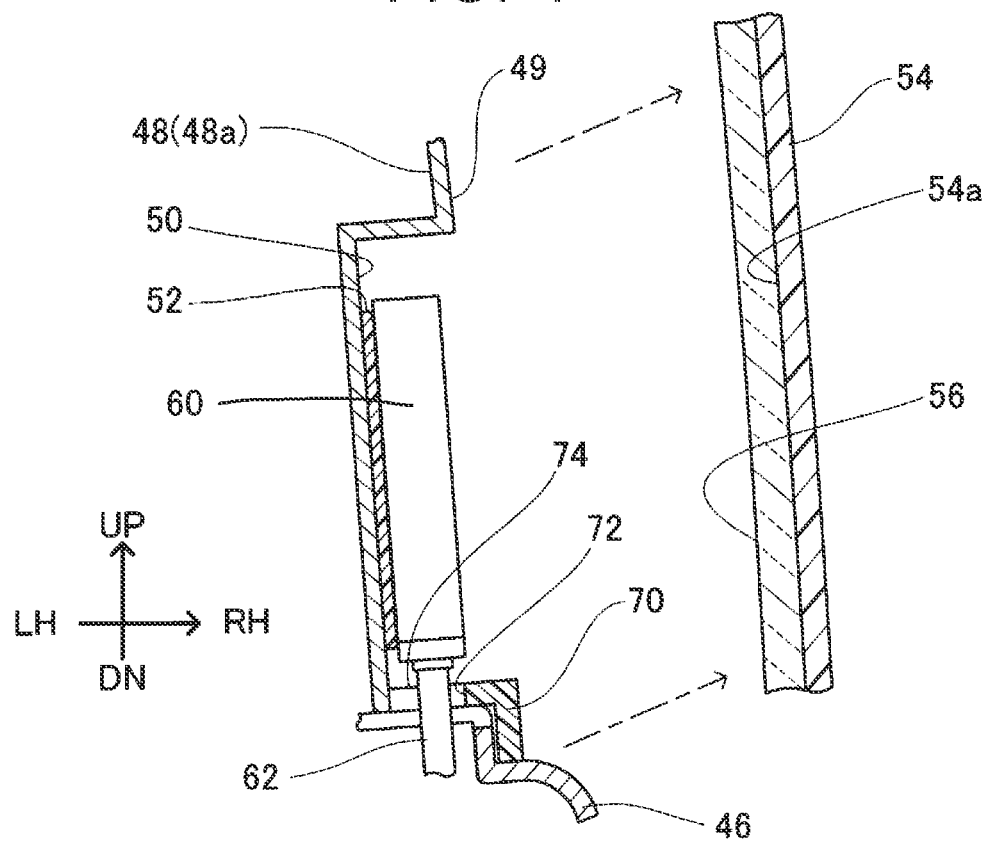
FIG. 4 is a sectional view taken along line IV-IV in FIG. 3.
Figure 5:
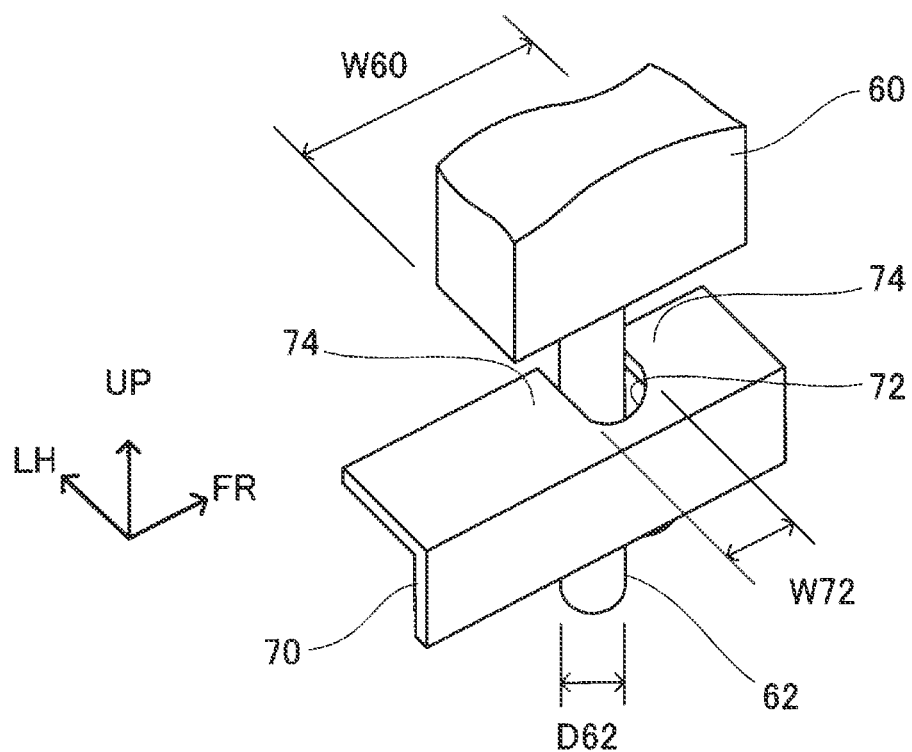
FIG. 5 is a perspective view illustrating a bracket 70.

As illustrated in FIGS. 4 and 5, the bracket 70 has a counterface 74 that faces the antenna 60 from below, at a position adjacent to the cable opening 72. In particular, in the bracket 70 according to the present embodiment, a pair of counterfaces 74 are provided on both sides of the cable opening 72 in the front-rear direction. With such a configuration, the antenna 60 that has come loose from the door frame 48 and descends along the door frame 48 is stably supported by the counterface 74 of the bracket 70.

Figure 6:
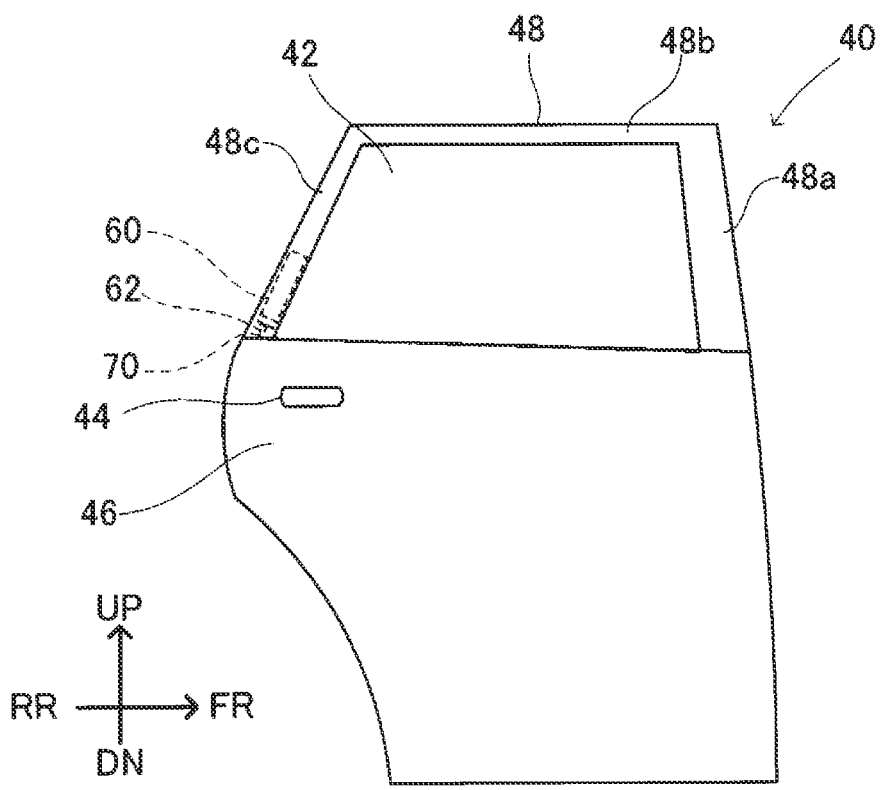
FIG. 6 illustrates a modification in which the mounting position of the antenna 60 is altered.

As illustrated in FIG. 6, the antenna 60 and the bracket 70 may be provided in the third section 48c in the door frame 48 of the rear side door 40, as a modification. The third section 48c of the door frame 48 also extends upward from the outer panel 46, and accordingly the antenna 60 may fall down to the inner side of the outer panel 46 when the antenna 60 comes loose (or peels off) from the door frame 48. Accordingly, even when the antenna 60 is attached to the third section 48c of the door frame 48, the above-described functional effect of the bracket 70 can be similarly anticipated by attaching the bracket 70.

Figure 7:
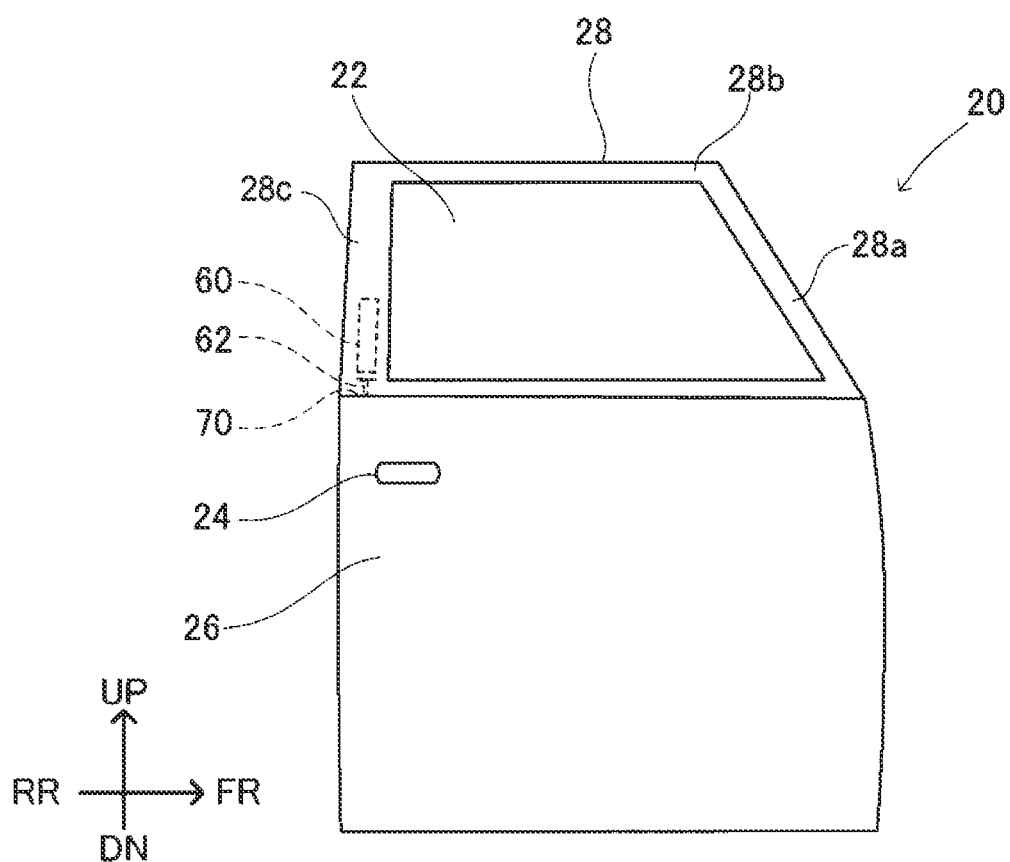
FIG. 7 illustrates another modification in which the mounting position of the antenna 60 is altered.

As shown in FIG. 7, the antenna 60 and the bracket 70 may be attached to the front side door 20, as another modification. In the same way as with the rear side door 40, the front side door 20 has an outer panel 26 located downward from the window 22 and a door frame 28 extending along the perimeter of the window 22. The door frame 28 generally has a first section 28a, a second section 28b, and a third section 28c. The first section 28a is located forward of the window 22 and extends upward from the outer panel 26. The second section 28b is located upward from the window 22 and extends rearward from the upper end of the first section 28a. The third section 28c is located rearward from the window 22 and extends downward from the rear end of the second section 28b to the outer panel 26. In other words, the third section 28c extends upward from the outer panel 26 to the rear end of the second section 28b.

In the front side door 20, the antenna 60 and the bracket 70 may be provided in the third section 28c of the door frame 28. Accordingly, the antenna 60 can be disposed so as to be in the proximity of the door handle 24 of the front side door 20, and the communicable range of the antenna 60 can be set to be in the vicinity of the door handle 24 of the front side door 20. Note however, that the antenna 60 and the bracket 70 may be provided in the first section 28a of the door frame 28 in the front side door 20, although omitted from illustration. In either section 28a and 28c, the door frame 28 extends upward from the outer panel 26, and accordingly the antenna 60 may fall down to the inner side of the outer panel 26 when the antenna 60 comes loose (or peels off) from the door frame 28. Accordingly, even when the antenna 60 is attached to the first section 28a or the third section 28c of the door frame 28, the above-described functional effect of the bracket 70 can be similarly anticipated by attaching the bracket 70.

In the vehicle 10 according to the present embodiment, the bracket 70 is located at the boundary between the outer panel 46 and the door frame 48, and is disposed along the boundary. With such a configuration, the portion where the cable 62 is routed inside the outer panel 46 can be covered by the bracket 70. Normally, an opening or a gap for passage of the cable 62 is often provided at a portion where the cable 62 is routed inside the outer panel 46. Noise entering the cabin 12c is suppressed by covering such an opening or gap with the bracket 70. In particular, this sort of sound insulation effect can be enhanced when the bracket 70 is made of a polymer such as resin.

Although an embodiment of the present technology has been described in detail above, the embodiment is merely illustrative and is not intended to limit the scope of the claims. The technology described in the claims includes various modifications and alternations of the specific examples exemplified above. The technical elements described in the present specification and the drawings have technical utility alone or in various combinations, and are not limited to the combinations described in the claims at the time of filing. The technology exemplified herein or in the drawings may achieve a plurality of objects at the same time, and has technical utility by achieving one of the objects by itself.

What is claimed is:

1. A vehicle, comprising:
   a side door including a window, the side door including an outer panel located downward from the window and a door frame extending along a perimeter of the window;
   an antenna fixed by double-sided adhesive tape on an outer face of a section of the door frame that extends in an up-down direction; and
   a bracket that is attached to the side door and that faces a cable extending downward from the antenna, the bracket including a cable opening through which the cable passes, between the bracket and the door frame, the cable opening has a shape through which the antenna is not able to pass.

2. The vehicle according to claim 1, wherein a dimension of the cable opening in a front-rear direction is smaller than a dimension of the antenna in the front-rear direction.

3. The vehicle according to claim 1, wherein the bracket includes a counterface that faces the antenna from below, at a position adjacent to the cable opening.

4. The vehicle according to claim 1, wherein:
   the side door is a rear side door adjacent to a front side door for a driver's seat, the rear side door being located rearward from the front side door; and
   the section of the door frame that extends in the up-down direction is a section located forward from the window.

5. The vehicle according to claim 1, wherein:
   the side door is a front side door for a driver's seat; and
   the section of the door frame that extends in the up-down direction to which the antenna is fixed is a section located rearward from the window.

6. The vehicle according to claim 1, wherein the antenna is configured to communicate with a wireless communication terminal possessed by a user of the vehicle.

7. The vehicle according to claim 1, wherein the antenna is an antenna for a smart key system.

8. The vehicle according to claim 1, wherein the side door is a hinged door.

* * * * *